(12) United States Patent
Foghi et al.

(10) Patent No.: US 12,433,209 B1
(45) Date of Patent: Oct. 7, 2025

(54) LAWN WATERING MACHINE

(71) Applicants: Abtin Foghi, Whitby (CA); Bassem Mesallam, Whitby (CA)

(72) Inventors: Abtin Foghi, Whitby (CA); Bassem Mesallam, Whitby (CA)

( * ) Notice: Subject to any disclaimer, the term of this patent is extended or adjusted under 35 U.S.C. 154(b) by 191 days.

(21) Appl. No.: 18/236,656

(22) Filed: Aug. 22, 2023

(51) Int. Cl.
*A01G 25/09* (2006.01)
*A01G 25/16* (2006.01)
*B60K 7/00* (2006.01)

(52) U.S. Cl.
CPC .............. *A01G 25/09* (2013.01); *A01G 25/16* (2013.01); *B60K 7/0007* (2013.01); *B60K 2007/0092* (2013.01)

(58) Field of Classification Search
CPC ...... A01G 25/00; A01G 25/16; B60K 7/0007; B60K 2007/0092
See application file for complete search history.

(56) References Cited

U.S. PATENT DOCUMENTS

| | | | |
|---|---|---|---|
| 9,491,904 B2 | 11/2016 | Jagenstedt | |
| 11,256,255 B2 | 2/2022 | He | |
| D965,030 S | 9/2022 | Mccutcheon | |
| 2012/0153042 A1 | 6/2012 | Oedekoven | |
| 2016/0366842 A1 | 12/2016 | Guy | |
| 2021/0337716 A1 | 11/2021 | Lee | |
| 2021/0360853 A1 | 11/2021 | Herrera | |
| 2022/0244732 A1 | 8/2022 | Suzuki | |
| 2023/0165200 A1* | 6/2023 | Katerberg | ............ G05D 1/0225 701/50 |

FOREIGN PATENT DOCUMENTS

EP 3994977 A1 * 5/2022 ............. A01G 25/09

* cited by examiner

*Primary Examiner* — Calvin Cheung
(74) *Attorney, Agent, or Firm* — Kyle A. Fletcher, Esq.

(57) ABSTRACT

The lawn watering machine is a robot. The lawn watering machine is a vehicle. The lawn watering machine is configured for use with a lawn. The lawn watering machine distributes water to the lawn. The lawn watering machine moves over the lawn as it is distributing water. The lawn watering machine includes a spray structure, a plurality of pedestal structures, and a control circuit. The control circuit mounts on the spray structure. The spray structure mounts on the plurality of pedestal structures. The plurality of pedestal structures elevates the spray structure above the lawn. The plurality of pedestal structures moves the lawn watering machine over the lawn. The control circuit controls the operation of the lawn watering machine.

11 Claims, 6 Drawing Sheets

LAWN WATERING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of Steering or guiding of agricultural vehicles. (A01B69/008)

SUMMARY OF INVENTION

The lawn watering machine is a robot. The lawn watering machine is a vehicle. The lawn watering machine is configured for use with a lawn. The lawn watering machine distributes water to the lawn. The lawn watering machine moves over the lawn as it is distributing water. The lawn watering machine comprises a spray structure, a plurality of pedestal structures, and a control circuit. The control circuit mounts on the spray structure. The spray structure mounts on the plurality of pedestal structures. The plurality of pedestal structures elevates the spray structure above the lawn. The plurality of pedestal structures moves the lawn watering machine over the lawn. The control circuit controls the operation of the lawn watering machine.

These together with additional objects, features and advantages of the lawn watering machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the lawn watering machine in detail, it is to be understood that the lawn watering machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lawn watering machine.

It is therefore important that the claims be regarded as including such equivalent construction insofar as they do not depart from the spirit and scope of the lawn watering machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons 7 skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
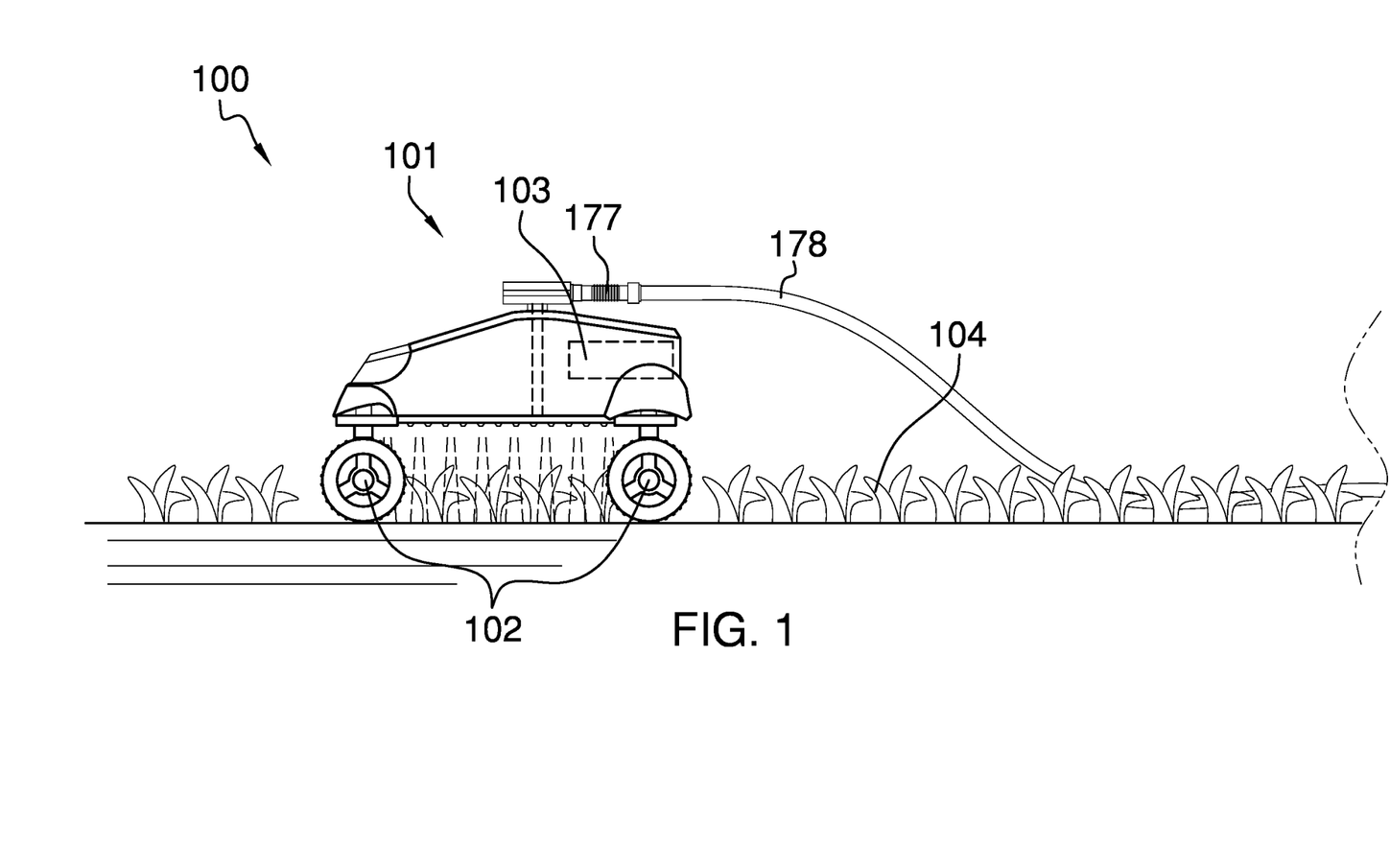
FIG. 1 is a side view of an embodiment of the disclosure.
Figure 2:
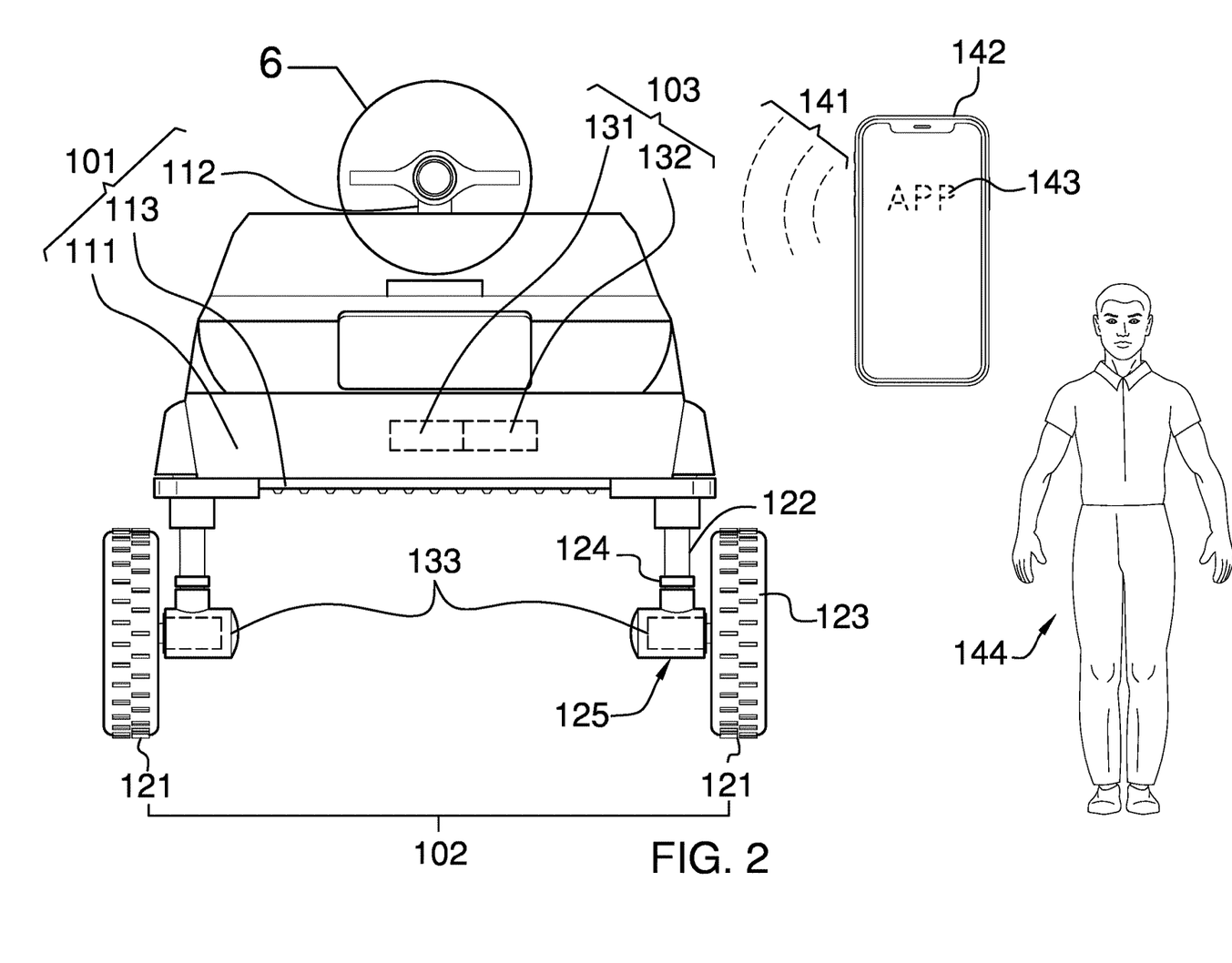
FIG. 2 is a front view of an embodiment of the disclosure.
Figure 3:
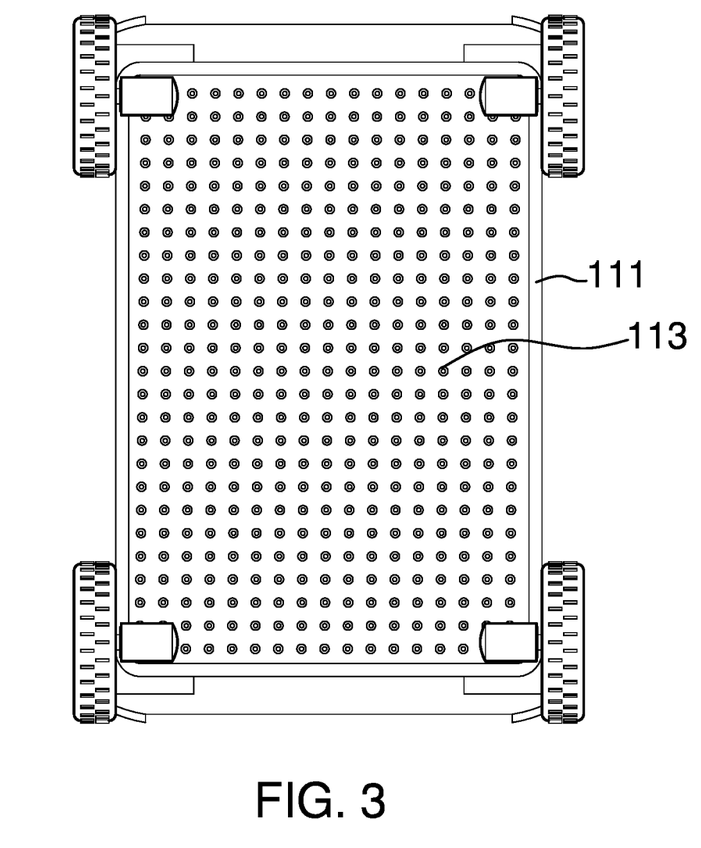
FIG. 3 is a bottom view of an embodiment of the disclosure.
Figure 4:
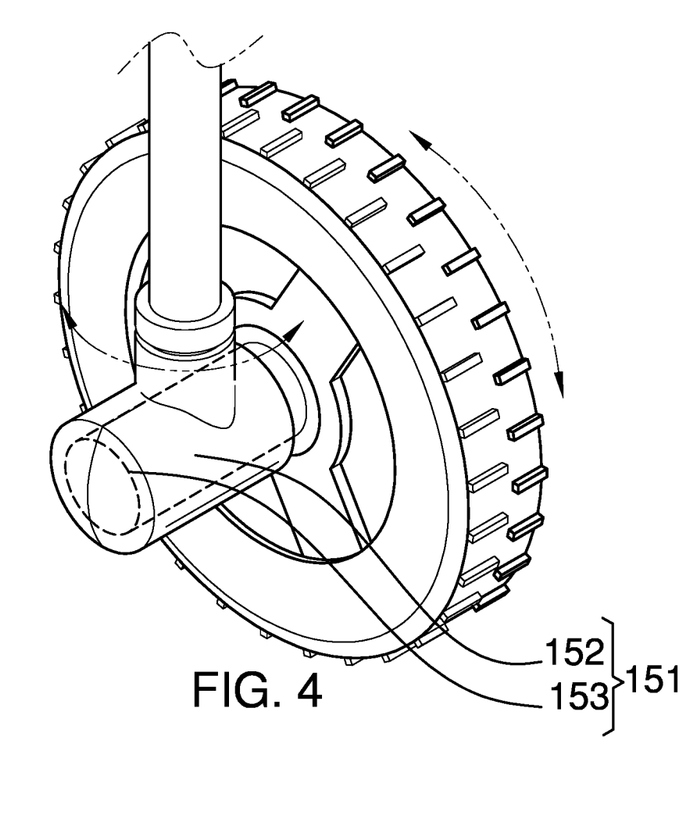
FIG. 4 is a detailed view of an embodiment of the disclosure.
Figure 5:
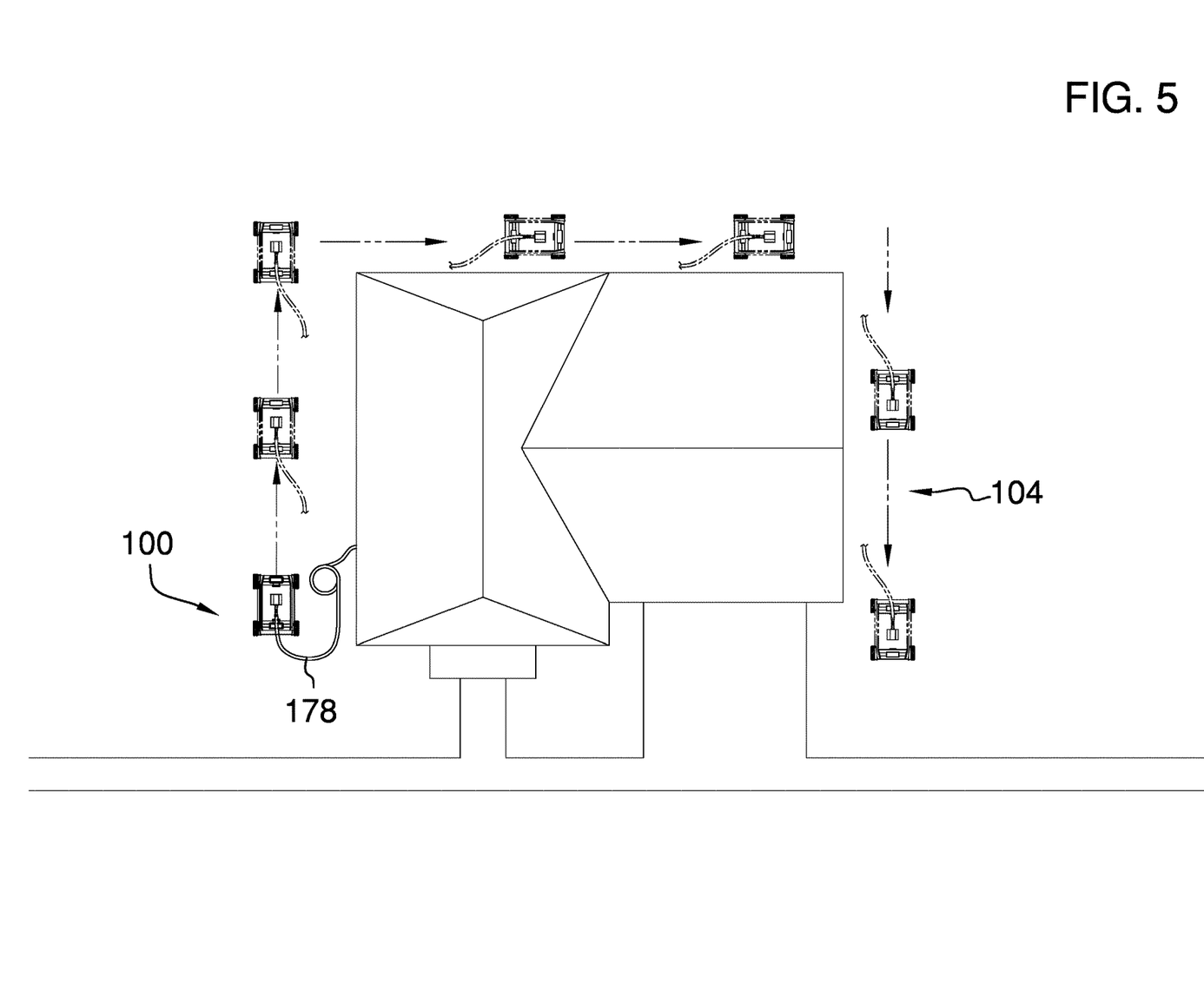
FIG. 5 is an in-use view of an embodiment of the disclosure.
Figure 6:
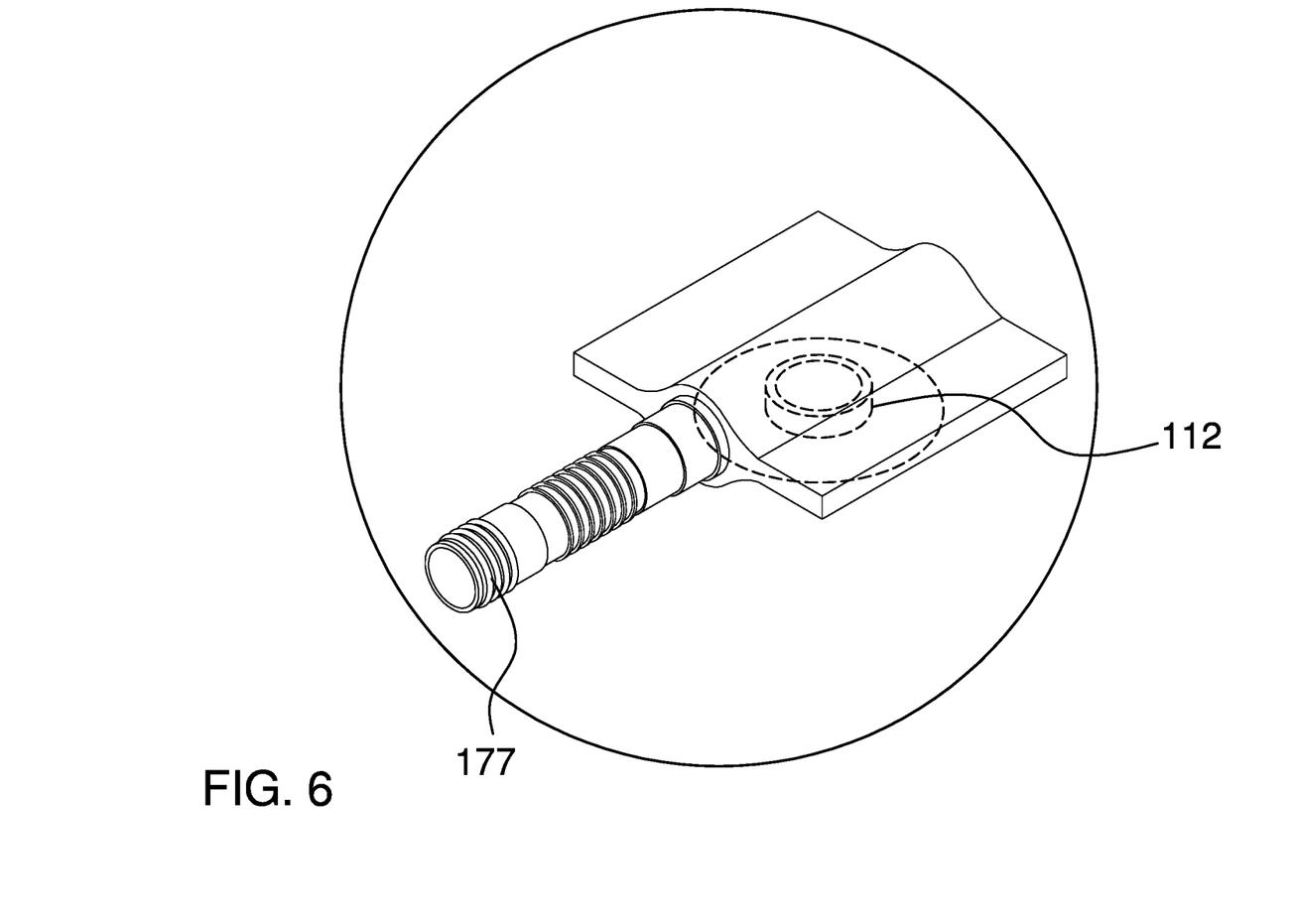
FIG. 6 is a detailed view of the circle in FIG. 2.

Detailed reference will now be made to one or more potential embodiments of the disclosure, which are illustrated in FIGS. 1 through 6.

The lawn watering machine 100 (hereinafter invention) is a robot. The invention 100 is a vehicle. The invention 100 is configured for use with a lawn 104. The invention 100 distributes water to the lawn 104. The invention 100 moves over the lawn 104 as it is distributing water. The invention 100 comprises a spray structure 101, a plurality of pedestal structures 102, and a control circuit 103. The control circuit 103 mounts on the spray structure 101. The spray structure 101 mounts on the plurality of pedestal structures 102. The plurality of pedestal structures 102 elevate the spray structure 101 above the lawn 104. The plurality of pedestal structures 102 move the invention 100 over the lawn 104. The control circuit 103 controls the operation of the invention 100.

The spray structure 101 is a manifold. The spray structure 101 receives water under pressure from an externally provided source of water. The spray structure 101 discharges the received water as a spray onto the lawn 104. The spray structure 101 comprises a disk structure 111, a fitting structure 112, and a plurality of spray nozzles 113.

The disk structure 111 is a disk shaped structure. The disk structure 111 is a hollow structure. The disk structure 111 forms the base structure of the spray structure 101. The inferior congruent end of the disk structure 111 attaches to the plurality of pedestal structures 102.

The fitting structure 112 is a fitting. The fitting structure 112 forms a detachable fluidic connection with the externally provided source of water. The fitting structure 112 receives water under pressure from the externally provided source of water. The fitting structure 112 forms a fluidic connection with the plurality of spray nozzles 113. The fitting structure 112 discharges the received water into the plurality of spray nozzles 113. The fitting structure 112 includes a hose fitting 171 that connects with a garden hose 178. Furthermore, the fitting structure 112 is able to rotate with respect to the disk structure 111.

The plurality of spray nozzles 113 forms the water discharge structure of the invention 100. The plurality of spray nozzles 113 discharge the water received from the fitting structure 112 onto the lawn 104. The plurality of spray nozzles discharge the received water in the form of a spray. The plurality of spray nozzles 113 mount on the inferior congruent end of the disk structure 111.

The plurality of pedestal structures 102 is a load bearing structure. The plurality of pedestal structures 102 forms the load path that transfers the loads of the spray structure 101 and the control circuit 103 to the supporting surface formed by the lawn 104. The plurality of pedestal structures 102 forms a rolling structure. The plurality of pedestal structures 102 allow the invention 100 to roll over the lawn 104 while distributing water. The plurality of pedestal structures 102 comprises a collection of individual pedestal structures 121.

Each individual pedestal structure 121 selected from the plurality of pedestal structures 102 is a load bearing structure. Each selected individual pedestal structure 121 forms a stanchion that elevates the spray structure 101 above the lawn 104. Each selected individual pedestal structure 121 forms a load path that transfers a portion of the loads of the spray structure 101 and the control circuit 103 to the lawn 104. Each selected individual pedestal structure 121 is a rolling structure. Each selected individual pedestal structure 121 allows the invention 100 to roll over the lawn 104. The control circuit 103 provides each selected individual pedestal structure 121 with the energy necessary to roll the invention 100 over the lawn 104. Each individual pedestal structure 121 selected from the plurality of pedestal structures 102 comprises stanchion structure 122, a wheel structure 123, a swivel mount 124, and a drive mount 125.

The stanchion structure 122 is a load bearing structure. The stanchion structure 122 is a rigid structure. The stanchion structure 122 is a prism shaped structure. The superior congruent end of the stanchion structure 122 attaches to the inferior congruent end of the disk structure 111 of the spray structure 101. The stanchion structure 122 forms a portion of the structure that elevates the spray structure 101 above the lawn 104. The stanchion structure 122 forms a load path that transfers a portion of the loads of the spray structure 101 and the control circuit 103 to the lawn 104.

The wheel structure 123 is a rotating structure. The wheel structure 123 is a wheel. The wheel structure 123 forms a portion of the structure that allows the invention 100 to roll over the lawn. The wheel structure 123 forms the inferior structure of the individual pedestal structure 121. The wheel structure 123 forms the final link of the load path that transfers the load carried by the stanchion structure 122 to the lawn 104.

The swivel mount 124 is a fastening device. The swivel mount 124 is a rotating structure. The swivel mount 124 forms the physical structure that attaches the drive mount 125 to the inferior congruent end of the stanchion structure 122 of the individual pedestal structure 121. The swivel mount 124 rotates the wheel structure 123 around an axis of rotation that aligns with the center axis of the stanchion structure 122.

The drive mount 125 is a mechanical structure. The drive mount 125 is a fastening device. The drive mount 125 forms the structure that attaches the wheel structure 123 to the swivel mount 124. The drive mount 125 attaches the wheel structure 123 to the swivel mount 124 such that the axis of rotation of the 14 wheel structure 123 is perpendicularly oriented to the center axis of the stanchion structure 122.

The control circuit 103 is an electric circuit. The control circuit 103 controls the operation of the invention 100. By controlling the operation of the invention 100 is meant that the control circuit 103 initiates the discharge of water onto the lawn 104. By controlling the operation of the control circuit 103 is meant that the control circuit 103 discontinues the discharge of water onto the lawn 104. By controlling the operation of the invention 100 it further meant that the control circuit 103 initiates the movement of the invention 100 over the lawn 104. By controlling the operation of the control circuit 103 it further meant that the control circuit 103 discontinues the movement of the invention 100 over the lawn 104. By controlling the operation of the control circuit 103 it further meant that the control circuit 103 determines the direction of the movement of the invention 100 over the lawn 104. The control circuit 103 is remotely controlled. The operation of the control circuit 103 is managed by an appropriate authority 144.

The control circuit 103 comprises a logic module 131, a communication module 132, and a plurality of wheel drive circuits 133. The logic module 131, the communication module 132, and the plurality of wheel drive circuits 133 are electrically interconnected. The communication module 132 further comprises a personal data device 142, an application 143, and the appropriate authority 144.

The logic module 131 is a readily and commercially available programmable electronic device that is used to manage, regulate, and operate the control circuit 103. The communication module 132 is a wireless electronic communication device that allows the logic module 131 to wirelessly communicate with a personal data device 142. The communication module 132 forms the first wireless communication link 141 with the personal data device 142. The communication module 132 exchanges one or more direct messaging facilities that are transmitted over the first wireless communication link 141 to the personal data device 142. The message contained in the direct messaging facility contains operating instructions intended to facilitate communication between the appropriate authority 144 and the personal data device 142. Examples of the operating instructions include but are not limited to a) initiating and discontinuing the watering activities of the invention 100; b) initiating and discontinuing the movement of the invention 100; and c) communicating and controlling the course of travel of the invention 100 over the lawn 104.

The personal data device 142 is a programmable electrical device. The personal data device 142 further comprises an application 143. The personal data device 142 provides data management and communication services through one or more functions referred to as an application 143. The application 143 is a set of logical operating instructions that are performed by the personal data device 142. The addition of an application 143 will provide increased functionality for the personal data device 142. This disclosure assumes that an application 143 exists for the purpose of interacting with the invention 100. The application 143 of the personal data device 142 forms an interface with the control circuit 103. The personal data device 142 transmits operating instructions over the first wireless communication link 141 to the control circuit 103. The communication module 132 receives the transmitted operating instructions and relays the received operating instructions to the logic module 131.

The plurality of wheel drive circuits 133 form the structures that drive the plurality of pedestal structures 102. By driving the plurality of pedestal structures 102 is meant 8 that the plurality of wheel drive circuits 133 provide the energy necessary to rotate the wheel structure 123 of each individual pedestal structure 121 selected from the plurality of pedestal structures 102. The plurality of wheel drive circuits 133 further controls the rotation of the wheel structure 123 of each selected individual pedestal structure 121. The plurality 14 of wheel drive circuits 133 independently controls the rotation of the wheel structure 123 of each individual pedestal structure 121 selected from the plurality of pedestal structures 102. The plurality of wheel drive circuits 133 comprises a collection of individual wheel drive circuits 151. Each individual wheel drive circuit 151 selected from the plurality of wheel drive circuit 133 further comprises a wheel drive motor 152 and a wheel drive motor 152 controller 153.

Each individual wheel drive circuit 151 selected from the plurality of wheel drive circuit 133 is an electric circuit. There is a one to one correspondence between each individual wheel drive circuit 151 selected from the plurality of wheel drive circuit 133 and an individual pedestal structure 121 selected from the plurality of pedestal structures 102. Each selected individual wheel drive circuit 151 provides the mechanical structure that controls the wheel structure 123 of the individual pedestal structure 121 associated with the selected individual wheel drive circuit 151. Each selected individual wheel drive circuit 151 controls the rotation of the associated wheel structure 123.

Each individual wheel drive circuit 151 selected from the plurality of wheel drive circuit 133 electrically connects to the logic module 131. The logic module 131 provides operating instructions to each individual wheel drive circuit 151 selected 14 from the plurality of wheel drive circuit 133. By controlling the rotation of the wheel structure 123 it meant that the 16 selected individual wheel drive circuit 151 provides the energy to rotate the associated wheel structure 123. By controlling the rotation of the wheel structure 123 it further meant that the selected individual wheel drive circuit 151 controls the speed of rotation of the associated wheel structure 123. By controlling the rotation of the wheel structure 123 it further meant that the selected individual wheel drive circuit 151 controls the direction of rotation of the associated wheel structure 123.

The wheel drive motor 152 is an electric motor. The wheel drive motor 152 converts electric energy into rotational energy. The wheel drive motor 152 mounts in the drive mount 125 of the associated individual pedestal structure 121. The wheel drive motor 152 forms a mechanical linkage with the associated wheel structure 123. The wheel drive motor 152 transfers the generated rotational energy to the associated wheel structure 123 through the mechanical linkage.

The wheel drive motor 152 controller 153 is a motor controller. The wheel drive motor 152 controller 153 controls the operation of the wheel drive motor 152. The wheel drive motor 152 electrically connects to the logic module 131. By controlling the operation of the wheel drive motor 152 it meant that the wheel drive motor 152 controller 153 controls the speed of rotation of the wheel drive motor 152. Controlling the operation of the wheel drive motor 152 is further meant that the wheel drive motor 152 controller 153 controls the direction of rotation of the wheel drive motor 152.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Bluetooth™: As used in this disclosure, Bluetooth™ is a standardized communication protocol that is used to wirelessly interconnect electronic devices.

Cant: As used in this disclosure, a cant is an angular deviation from one or more reference lines (or planes) such as a vertical line (or plane) or a horizontal line (or plane).

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinders, prism or pyramidal structures share the same line they are said to be aligned. When the center axes of two cylinders, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures is joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Dilute Solution: As used in this disclosure, a dilute solution refers to the concentration of a solute within a solvent. Specifically, a solute is considered to have a dilute concentration if a person skilled in the art would not consider the presence of the solute at the dilute concentration to have practical significance within the context of the disclosure.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggests otherwise, the specified horizontal surface is the supporting surface the 11 potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Fitting: As used in this disclosure, a fitting is a component that attaches a first object to a second object. The fitting is used to form a fluidic connection between the first object and the second object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts. 8 Housing: As used in this disclosure, a housing is a rigid structure that encloses and protects one or more devices.

Independent: As used in this disclosure, the term independent refers to the relationship between the operation and control of a first device and a second device. The first device and the second device are independent from each other if: a) the operation of the first device is neither impacted nor influenced by the operation of the second device; and b) the operation of the second device is neither impacted nor influenced by the operation of the first device.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lawn: As used in this disclosure, a lawn refers to a field that grows grass. The grass in a lawn is often referred to as turf.

Load: As used in this disclosure, the term load refers to an object upon which a force is acting, or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Manifold: As used in this disclosure, a manifold is a pipe or chamber having several ports through which one or more fluids are gathered or distributed.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of a) a congruent end of the prism structure that forms the pan; and b) a lateral face of the prism structure that forms the pan. A semi-enclosed pan refers to a pan wherein the closed end of prism structure of the pan and/or a portion of the closed lateral faces of the pan are open.

PDD: As used in this disclosure, PDD is an acronym for personal data device.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Plant: As used in this disclosure, a plant is a biological organism: 1) that is not capable of movement over significant distances; and 2) that uses photosynthesis to create nutrients. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant. As used in this disclosure, the term foliage refers to the leaves and branches of a plant. The structure of the plant where photosynthesis occurs is called the leaf. The trunk of a plant refers to the portion of a plant that forms the biological connections between the roots of the plant and the foliage of the plant. The roots of the plant refer to the biological subsystem of the plant that draws nutrients into the plant through the soil.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism is congruent; and 2) the two congruent faces are parallel to each other. The two congruent faces are also commonly referred to as the ends of the prism. The surfaces that connect the two congruent faces are called the lateral faces. In this disclosure, when further description is required, a prism will be named for the geometric or descriptive name of the form factor of the two congruent faces. If the form factor of the two corresponding faces has not clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Robot: As used in this disclosure, a robot is a programmable electronic device that automatically performs a series of predetermined actions.

Rotation: As used in this disclosure, rotation refers to the cyclic movement of an object around a fixed point or fixed axis. The verb of rotation is to rotate.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline, they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Vehicle: As used in this disclosure, a vehicle is a device that is used for transporting passengers, goods, or equipment. The term motorized vehicle specifically refers to a vehicle that can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vernacular: As used in this disclosure, vernacular is a noun that refers to the common meaning and usage of a word as opposed to a specialized or more specific meaning and usage of the same word by a person skilled in an art.

Water: As used in this disclosure, water (CAS 7732-18-5) is a molecule comprising two hydrogen atoms and one oxygen molecule. The phase of water at normal temperature and pressure is liquid. As used in this disclosure, the definition of water is expanded to include dilute water-based solutions of salts and ionic structures using water as the solvent. Water in a gas phase is often referred to as steam. Water in a solid phase is often referred to as ice. Snow refers to a bulk solid form of ice.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A lawn watering machine comprising
a spray structure, a plurality of pedestal structures, and a control circuit;
wherein the control circuit mounts on the spray structure;
wherein the spray structure mounts on the plurality of pedestal structures;
wherein the plurality of pedestal structures elevate the spray structure above the lawn such that the spray structure is directed down towards the lawn;
wherein the plurality of pedestal structures move the lawn watering machine over the lawn;
wherein the spray structure discharges the received water as a spray onto the lawn;
wherein the control circuit comprises a logic module, a communication module, and a plurality of wheel drive circuits;
wherein the logic module, the communication module, and the plurality of wheel drive circuits are electrically interconnected;
wherein the communication module further comprises a personal data device, an application, and the appropriate authority;
wherein the communication module forms the first wireless communication link with the appropriate authority through the personal data device;
wherein the plurality of spray nozzles mount on an inferior congruent end of the disk structure.

2. The lawn watering machine according to claim 1
wherein the lawn watering machine is a vehicle;
wherein the lawn watering machine is configured for use with a lawn;
wherein the lawn watering machine distributes water to the lawn;

wherein the lawn watering machine moves over the lawn as it is distributing water.

3. The lawn watering machine according to claim 2
wherein the spray structure is a manifold;
wherein the spray structure receives water under pressure from an externally provided source of water.

4. The lawn watering machine according to claim 3
wherein the plurality of pedestal structures is a load bearing structure;
wherein the plurality of pedestal structures forms the load path that transfers the loads of the spray structure and the control circuit to the supporting surface formed by the lawn;
wherein the plurality of pedestal structures forms a rolling structure;
wherein the plurality of pedestal structures allow the lawn watering machine to roll over the lawn while distributing water.

5. The lawn watering machine according to claim 4
wherein the control circuit is an electric circuit;
wherein the control circuit controls the operation of the lawn watering machine;
wherein by controlling the operation of the lawn watering machine is meant that the control circuit initiates the discharge of water onto the lawn;
wherein by controlling the operation of the control circuit is meant that the control circuit discontinues the discharge of water onto the lawn;
wherein by controlling the operation of the lawn watering machine it further meant that the control circuit initiates the movement of the lawn watering machine over the lawn;
wherein by controlling the operation of the control circuit it further meant that the control circuit discontinues the movement of the lawn watering machine over the lawn;
wherein by controlling the operation of the control circuit it further meant that the control circuit determines the direction of the movement of the lawn watering machine over the lawn.

6. The lawn watering machine according to claim 5
wherein the spray structure comprises a disk structure, a fitting structure, and a plurality of spray nozzles;
wherein the fitting structure and the plurality of spray nozzles attach to the disk structure.

7. The lawn watering machine according to claim 6
wherein the plurality of pedestal structures comprises a collection of individual pedestal structures;
wherein each individual pedestal structure selected from the plurality of pedestal structures is a load bearing structure;
wherein each selected individual pedestal structure forms a stanchion that elevates the spray structure above the lawn;
wherein each selected individual pedestal structure forms a load path that transfers a portion of the loads of the spray structure and the control circuit to the lawn;
wherein each selected individual pedestal structure is a rolling structure;
wherein each selected individual pedestal structure allows the lawn watering machine to roll over the lawn;
wherein the control circuit provides each selected individual pedestal structure with the energy necessary to roll the lawn watering machine over the lawn.

8. The lawn watering machine according to claim 7
wherein the disk structure is a disk shaped structure;
wherein the disk structure is a hollow structure;
wherein the disk structure forms the base structure of the spray structure;
wherein the inferior congruent end of the disk structure attaches to the plurality of pedestal structures;
wherein the fitting structure is a fitting;
wherein the fitting structure forms a detachable fluidic connection with the externally provided source of water;
wherein the fitting structure receives water under pressure from the externally provided source of water;
wherein the fitting structure forms a fluidic connection with the plurality of spray nozzles;
wherein the fitting structure discharges the received water into the plurality of spray nozzles;
wherein the plurality of spray nozzles forms the water discharge structure of the lawn watering machine;
wherein the plurality of spray nozzles discharge the water received from the fitting structure onto the lawn;
wherein the plurality of spray nozzles discharge the received water in the form of a spray.

9. The lawn watering machine according to claim 8
wherein each individual pedestal structure selected from the plurality of pedestal structures comprises stanchion structure, a wheel structure, a swivel mount, and a drive mount;
wherein the stanchion structure is a load bearing structure;
wherein the stanchion structure is a rigid structure;
wherein the stanchion structure is a prism shaped structure;
wherein the superior congruent end of the stanchion structure attaches to the inferior congruent end of the disk structure of the spray structure;
wherein the stanchion structure forms a portion of the structure that elevates the spray structure above the lawn;
wherein the stanchion structure forms a load path that transfers a portion of the loads of the spray structure and the control circuit to the lawn;
wherein the wheel structure is a rotating structure;
wherein the wheel structure is a wheel;
wherein the wheel structure forms a portion of the structure that allows the lawn watering machine to roll over the lawn;
wherein the wheel structure forms the inferior structure of the individual pedestal structure;
wherein the wheel structure forms the final link of the load path that transfers the load carried by the stanchion structure to the lawn;
wherein the swivel mount is a fastening device;
wherein the swivel mount is a rotating structure;
wherein the swivel mount forms the physical structure that attaches the drive mount to the inferior congruent end of the stanchion structure of the individual pedestal structure;
wherein the swivel mount rotates the wheel structure around an axis of rotation that aligns with the center axis of the stanchion structure;
wherein the drive mount is a mechanical structure;
wherein the drive mount is a fastening device;
wherein the drive mount forms the structure that attaches the wheel structure to the swivel mount;
wherein the drive mount attaches the wheel structure to the swivel mount such that the axis of rotation of the wheel structure is perpendicularly oriented to the center axis of the stanchion structure.

10. The lawn watering machine according to claim 9
wherein the logic module is a programmable electronic device;
wherein the communication module is a wireless electronic communication device that allows the logic module to wirelessly communicate with a personal data device;
wherein the communication module exchanges one or more direct messaging facilities that are transmitted over the first wireless communication link to the personal data device;
wherein the message contained in the direct messaging facility contains operating instructions intended to facilitate communication between the appropriate authority and the personal data device.

11. The lawn watering machine according to claim 10
wherein the plurality of wheel drive circuits form the structures that drive the plurality of pedestal structures;
wherein by driving the plurality of pedestal structures is meant that the plurality of wheel drive circuits provide the energy necessary to rotate the wheel structure of each individual pedestal structure selected from the plurality of pedestal structures;
wherein the plurality of wheel drive circuits further controls the rotation of the wheel structure of each selected individual pedestal structure;
wherein the plurality of wheel drive circuits independently controls the rotation of the wheel structure of each individual pedestal structure selected from the plurality of pedestal structures.

* * * * *